United States Patent [19]

Elazari et al.

[11] 4,431,231
[45] Feb. 14, 1984

[54] RECLINABLE-SEAT AND FOLDABLE-TABLE ASSEMBLY

[75] Inventors: Amos Elazari, Tiberias; Moshe Levin, Ramat Hagolan, both of Israel

[73] Assignee: Golan Industries Ltd., Ramat Hagolan, Israel

[21] Appl. No.: 312,316

[22] Filed: Oct. 16, 1981

[51] Int. Cl.³ .............................................. A47B 39/00
[52] U.S. Cl. .................................. 297/163; 297/167; 297/191
[58] Field of Search ............... 297/167, 164, 165, 191, 297/354; 244/118.5, 118.6, 122 R

[56] References Cited

U.S. PATENT DOCUMENTS

| | | | |
|---|---|---|---|
| 3,336,076 | 8/1967 | Malette | 297/163 X |
| 3,588,172 | 6/1971 | McGregor | 297/191 |
| 3,773,381 | 11/1973 | Brennan | 297/163 X |
| 3,910,632 | 10/1975 | Marechal | 297/191 X |
| 4,141,586 | 2/1979 | Göldner et al. | 297/167 |
| 4,159,071 | 6/1979 | Roca | 297/191 X |
| 4,281,874 | 8/1981 | Iwans et al. | 297/163 |
| 4,364,604 | 12/1982 | Brunelle | 297/163 |

Primary Examiner—James T. McCall
Attorney, Agent, or Firm—Benjamin J. Barish

[57] ABSTRACT

A reclinable-seat and foldable-table assembly comprises a seat having a backrest pivotable about a horizontal axis from an upright position to a reclining position, and a table pivotable with the backrest from its upright position to its reclining position. The table is further movable from a folded non-operative position against the rear side of the backrest to an open operative position for use by the occupier of the seat to the rear of the backrest. The assembly further includes blocking means effective, when the table is moved to its open operative position, to block the backrest from being pivoted to its reclining position.

11 Claims, 11 Drawing Figures

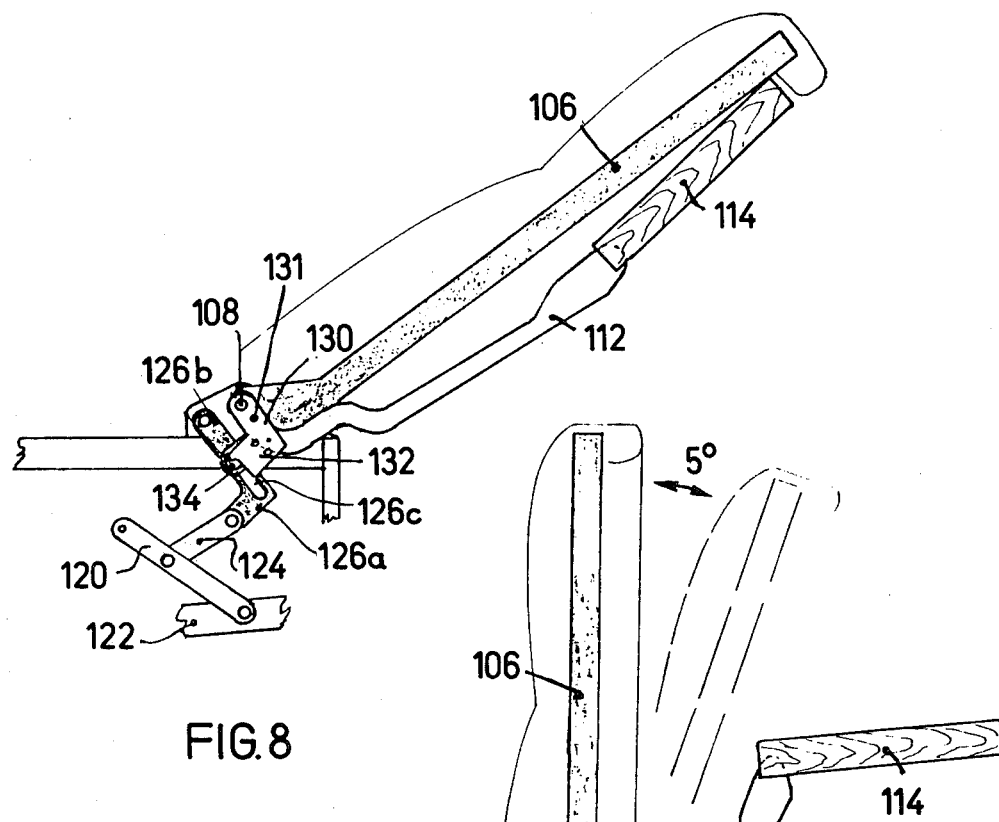
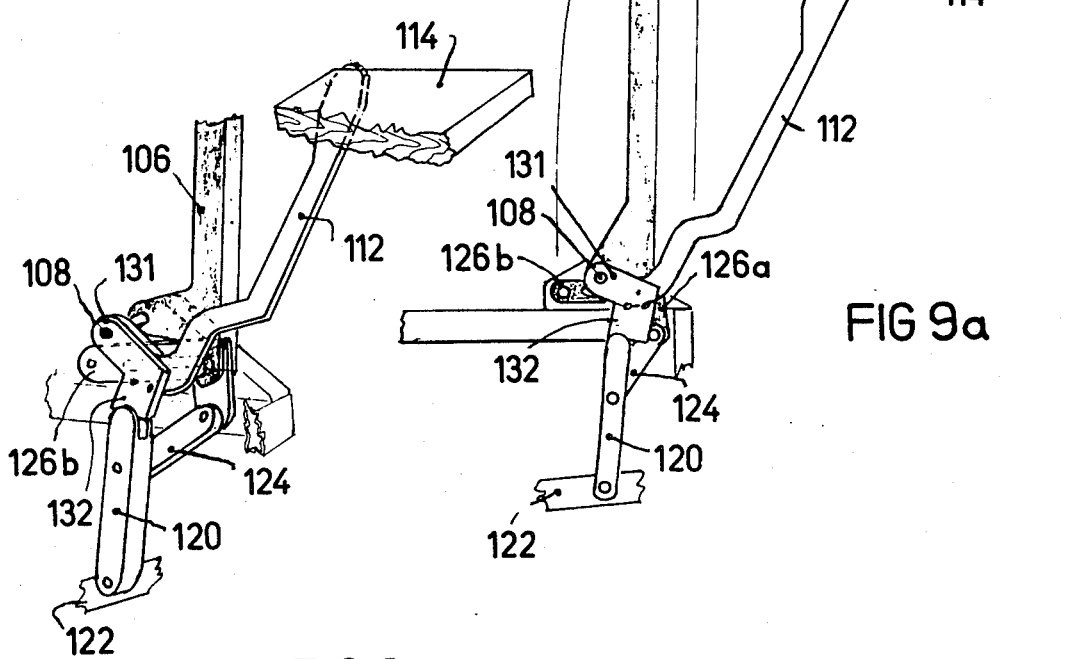

RECLINABLE-SEAT AND FOLDABLE-TABLE ASSEMBLY

BACKGROUND OF THE INVENTION

The present invention relates to a reclinable-seat and foldable-table assembly such as frequently provided on passenger aircraft.

Reclinable-seat and foldable-table assemblies provided on passenger aircraft generally include a backrest pivotable about a horizontal axis from an upright position to a reclining position, and a table pivotable with the backrest from the upright position to the reclining position. The table in such an assembly is further movable (usually by pivoting) from a folded non-operative position against the rear side of the backrest, to an open operative position for use by the occupier of the seat to the rear of the respective backrest. In its operative position, the table may be used for writing purposes, or for purposes of holding food or drink. Before the occupier of a seat pivots his backrest downwardly, he should look behind to make sure that this will not be disturbing to the occupier of the seat to the rear, who may be using the table for one of these purposes. However, aircraft passengers are not always that thoughtful, and therefore it frequently happens that a person moves his backrest to the reclining position without checking to the rear, and thereby may upset the table of the passenger to his rear, which can be particularly disturbing if it happens to have food or drink on it at that time.

An object of the present invention is to provide a reclinable-seat and foldable-table assembly of the above type which avoids the above-mentioned problem.

BRIEF SUMMARY OF THE INVENTION

According to a broad aspect of the present invention, there is provided a reclinable-seat and foldable-table assembly as described above, which assembly further includes blocking means effective, when the table is moved to its operative position, to block the backrest from being pivoted to the reclining position.

Thus, if a passenger has moved the foldable-table to its open operative position, for example for purposes of supporting food or drink, this itself will automatically prevent the forward passenger from tipping the table and causing food or drink to be spilled by attempting to move the backrest of his seat to the reclining position.

Preferably, the blocking means includes limiting means effective, when the table is moved to its open operative position, to limit the pivotable movement of the backrest to an intermediate position between the upright and reclining positions. In other words, moving the table to its operative position will still permit the occupier of the forward seat to recline his backrest, but will limit the degree of reclining to an intermediate position such as not to cause the food or drink on the tray to be spilled.

Two embodiments of the invention are described below for purposes of example. In both embodiments, the table includes an arm member pivotably mounted at its lower end to a folded non-operative position or to an open operative position with respect to the backrest, and a tray member pivotably mounted at the upper end of the arm member to a folded non-operative position substantially parallel to the arm member, or to an open operative position at an obtuse angle to the arm member, said blocking means being effective, when one of said table members is in its open operative position, to block the backrest from being pivoted to said reclining position.

However, in one described embodiment, the blocking means is effective when the tray member is moved to its operative position to block the backrest from being pivoted to the reclining position. In the second described embodiment, the blocking means is effective when the arm member is moved to its open operative position.

Further features and advantages of the invention will be apparent from the description below.

BRIEF DESCRIPTION OF THE DRAWINGS

The invention is herein described, by way of example only, with reference to the accompanying drawings, wherein:

FIG. 8 is a side elevational view of the blocking mechanism of FIG. 7 in its ineffective condition so that the backrest may be pivoted to its full reclining position; and FIG. 9 is a three-dimensional view, FIG. 9a being a side elevational view thereof, of the blocking mechanism in its effective condition to block the pivoting of the backrest to its reclining position.

DESCRIPTION OF PREFERRED EMBODIMENTS

Figure 1:
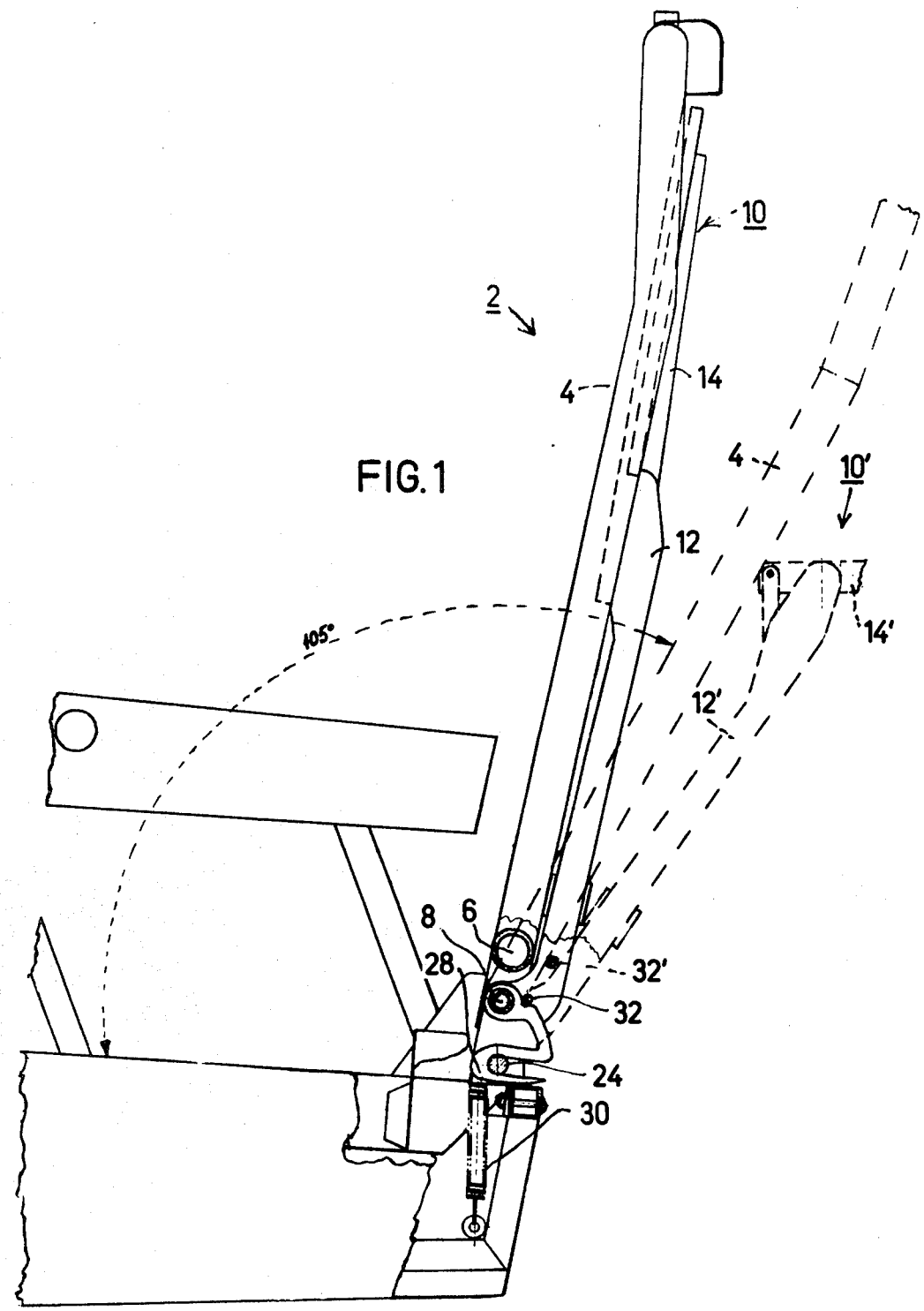
FIG. 1 is a side elevational view, partly in section, illustrating one form of reclinable-seat and foldable-table assembly constructed in accordance with the invention.
Figure 2:
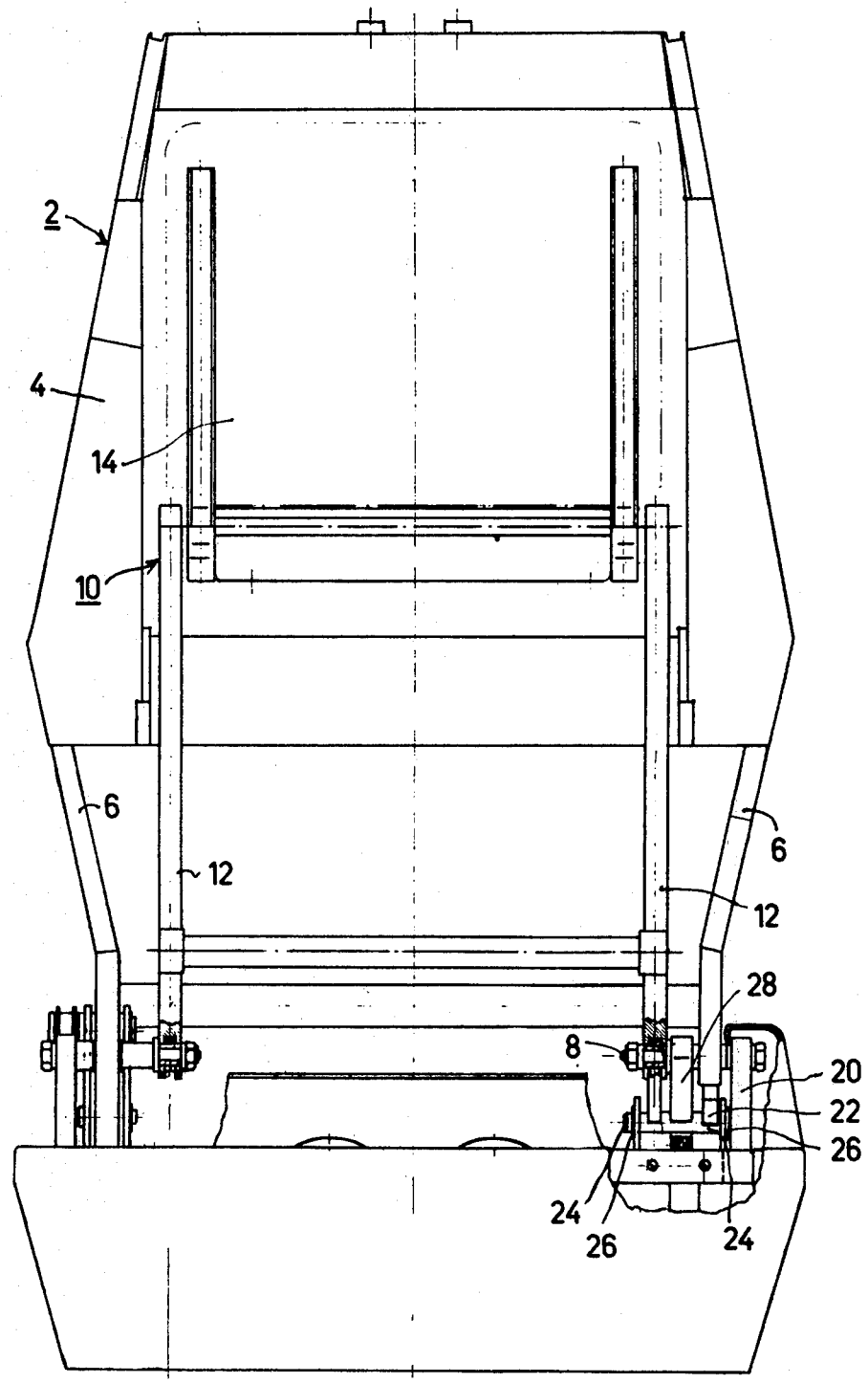
FIG. 2 is a rear elevational view of the assembly of FIG. 1.

With reference to FIGS. 1 and 2, there is illustrated a passenger seat, generally designated 2, including a backrest 4 supported by a frame 6 pivotably mounted about horizontal axis 8 from an upright position, shown in full lines in FIG. 1, to a reclining position. FIG. 1 does not illustrate the full reclining position of the backrest 4, but does illustrate a partially-reclined position by the broken lines 4', e.g., reclined 105°.

This reclinable-seat assembly further includes a foldable-table, generally designated 10, constituted by a pair of spaced arm members 12 pivotably mounted at their lower ends about horizontal axis 8, and carrying a tray member 14 at their upper ends. Table arms 12 are pivotable above axis 8 either to a folded, non-operative position against the backrest 4 as shown by the full lines 12 in FIG. 1, or to an open, operative position with respect to the backrest 4 as shown by the broken lines 12'. Tray member 14 may also be pivoted from a folded, non-operative position substantially parallel to arms 12 as shown by full lines 14 in FIG. 1, or to an open, operative position at an obtuse angle to the arms 12 as shown by broken lines 14'.

The seat assembly 2 illustrated in FIGS. 1 and 2 includes blocking means effective, when the table 10 is moved to its open, operative position as illustrated by the broken lines 10' in FIG. 1, to block the backrest 4 from being pivoted to the full reclining position. In the embodiment of the invention illustrated in FIGS. 1 and 2, the blocking means is provided only on one side of the seat (right side in FIG. 2) and is effective when the table tray 14 is moved to its open, operative position, to block the backrest. Also, the blocking means in this embodiment is effective not to block any pivoting of the backrest 4, but rather to limit the pivotable movement of the backrest to an intermediate position, as shown by the broken lines 4' in FIG. 1, between its full upright position (full lines in FIG. 1) and its full reclining position, such as to avoid causing food or drink on the table to be upset.

Figure 3:
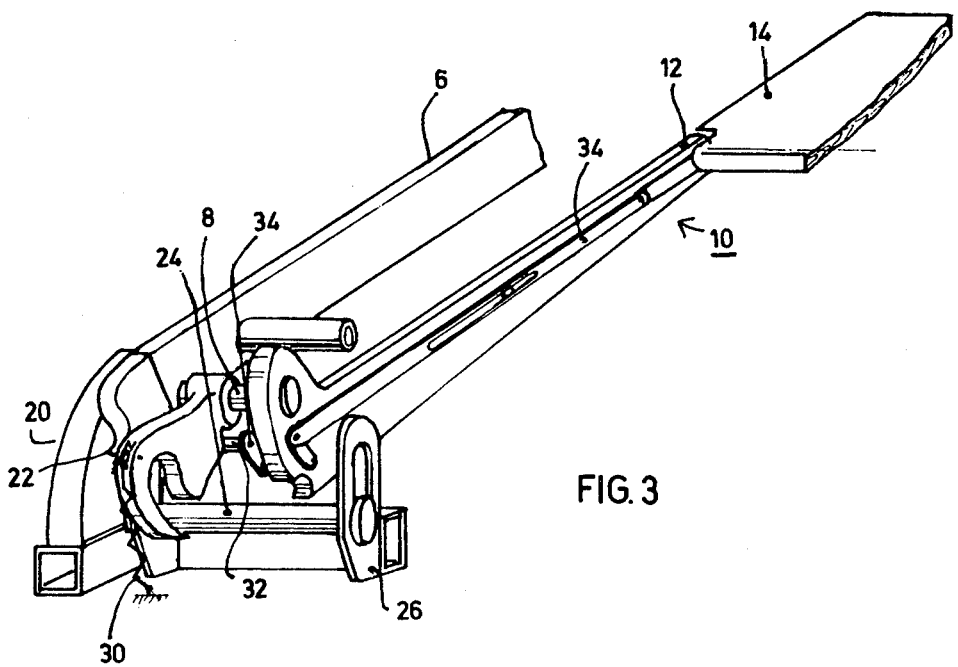
FIG. 3 is a three-dimensional view illustrating the blocking mechanism of FIG. 1 in its disabled condition so that it does not block the backrest from being moved to its reclining position.
Figure 4:
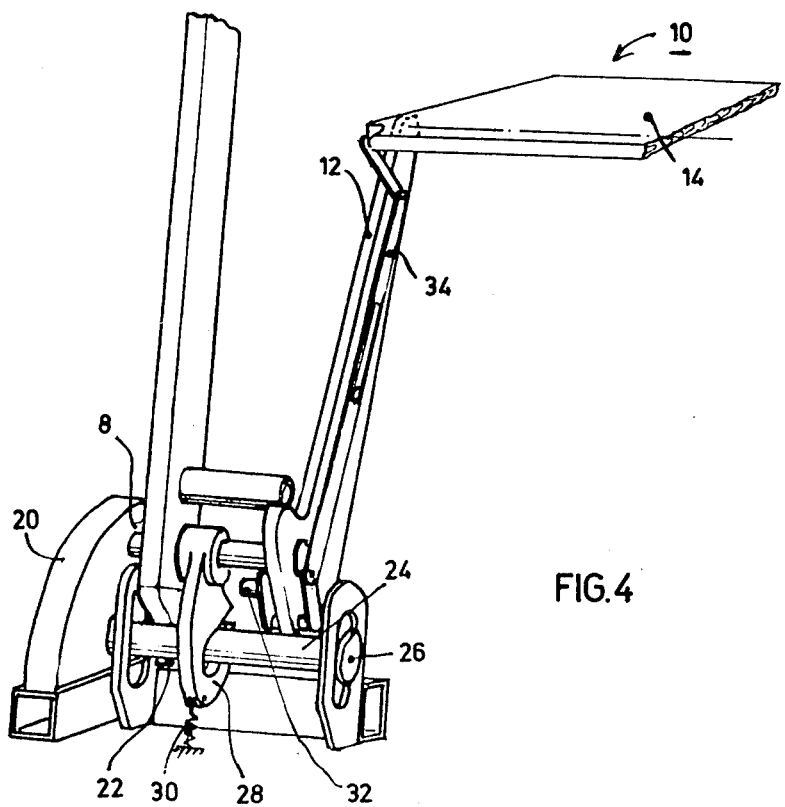
FIG. 4 is a three-dimensional view illustrating the blocking mechanism of FIG. 1 in its effective position to block the backrest from being pivoted to its reclining position.
Figure 5:
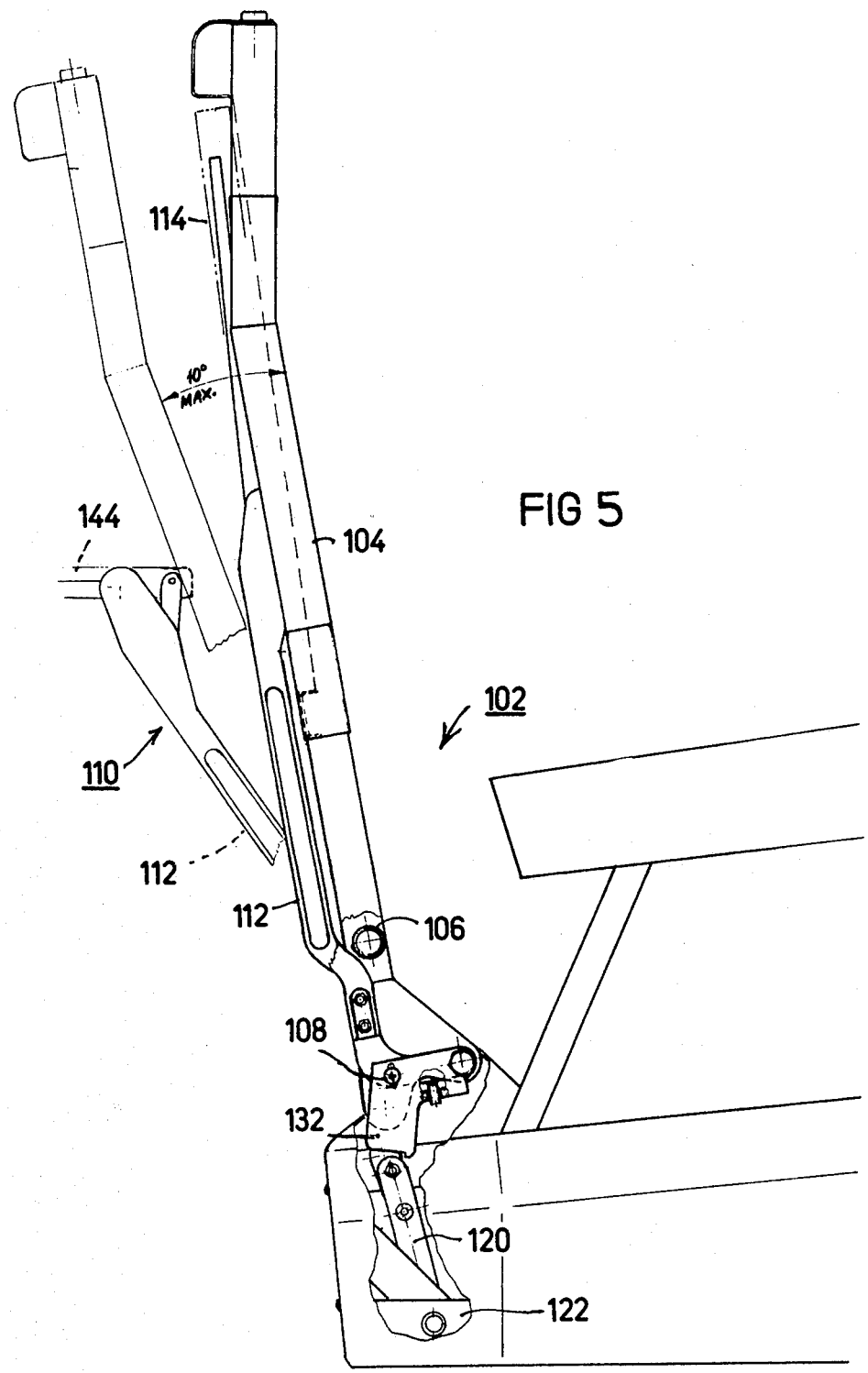
FIG. 5 is a side elevational view of another reclinable-seat and foldable-table assembly constructed in accordance with the invention.
Figure 6:
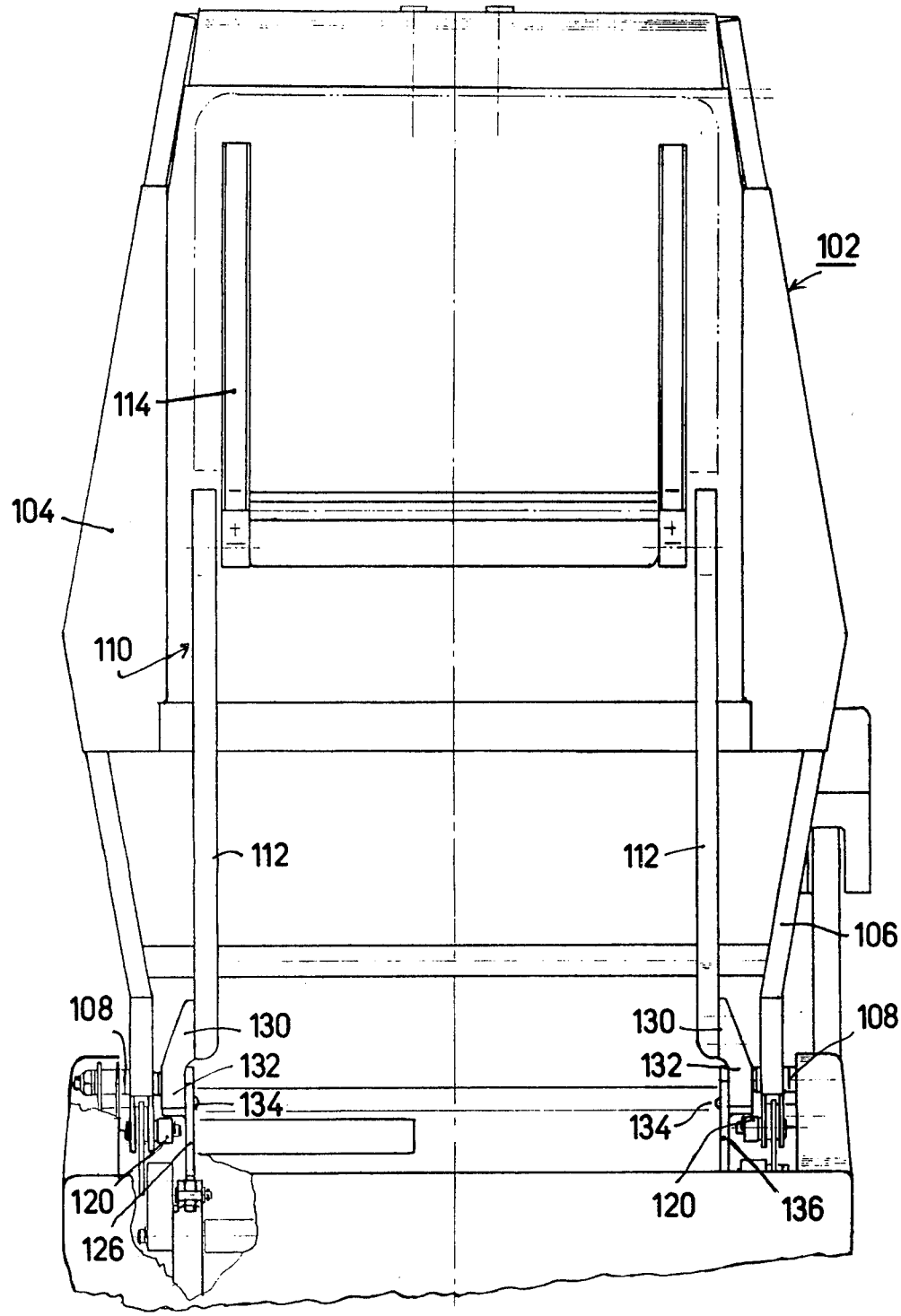
FIG. 6 is a rear elevational view of the assembly of FIG. 5.

Thus, as shown in FIGS. 3 and 4, backrest frame 6 is pivotably mounted about horizontal axis 8 to a frame member 20. The backrest frame 6 includes an extension 22 at its lower end, below the pivot axis 8. This extension 22 cooperates with a blocking pin 24 movable between a pair of slotted end plates 26. In the lower position of the pin as illustrated in FIG. 3, it permits the backrest to be pivoted to its full reclining position, but in the upper position of the pin, as illustrated in FIG. 4, it limits the pivotal movement of the backrest to an intermediate reclining position wherein it will not upset any food or drink supported on tray 14.

Blocking pin 24 is received within the slot of a plate 28 pivotably mounted to the frame and tray horizontal axis 8. Plate 28 is urged by a spring 30 to a normal position as illustrated in FIG. 4, in which position blocking pin 24 is raised to block the pivoting of the backrest to its full reclining position. Plate 28, however, may be pivoted against spring 30 by an interposer pin 32, which may be moved to an active position to engage pivotal plate 28, or to an inactive position not to engage this plate, when the seat backrest 4 and table assembly 10 are pivoted about horizontal axis 8.

Interposer pin 32 is at one end of a linkage, generally designated 34, connected to the table tray 14, such that when the table tray is in its open operative position, as illustrated in FIG. 4, the interposer pin 32 is located in the full line position illustrated in FIG. 1. In this position, pin 32 is substantially aligned with, but spaced slightly laterally from, the pivot axis 8 so as to engage the pivotal plate 28 when both the backrest 4 and the table assembly 10 are pivoted towards the reclining position of the backrest. However, when the table tray 14 is moved to its folded, non-operative position as illustrated in FIG. 3, the interposer pin 32 is moved by the linkage 34 to the broken line position illustrated at 32' in FIG. 1, namely, above the pivotal axis 8 so as not to engage the pivotal plate 28 when the backrest 4 and table assembly 10 are pivoted to the reclining position.

The assembly illustrated in FIGS. 1–4 operates as follows: Assuming that the backrest 4 is in its upright position, and that the table assembly 10 is in its folded, non-operative position, both as illustrated in full lines in FIG. 1, it will be seen that the interposer 32 coupled to the table tray 14 by linkage 34 will be in its lower position, as illustrated in full lines in FIG. 1. This is the active position of the interposer, and accordingly, as the backrest 4 is pivoted towards its reclining position (clockwise in FIG. 1), interposer 32, being carried by the table assembly 10, will engage the pivotal plate 28 during the pivoting of the table assembly with the backrest. Thus, during this pivoting of the table assembly with the backrest, interposer pin 32 will pivot plate 28 (also clockwise in FIG. 1), causing the blocking pin 24 to move downwardly within the slot of the pivotal plate 28 such that it does not engage the end extension 22 of the backrest 4. Accordingly, both the backrest 4 and the table assembly 10 will be free for pivotal movement to the full reclining position of the backrest.

If, however, while the backrest 4 is in its upright position the table assembly 10 is moved to its open operative position, as illustrated in broken lines in FIG. 1, opening the table tray 14 will, via linkage 34, move interposer pin 32 to the upper broken-line position 32' illustrated in FIG. 1. This is the inactive position of the interposer pin, and in this position, it will not engage pivotal plate 28 when the table assembly 10 is pivoted with the backrest 4 towards the reclining position of the backrest. Accordingly, pivotal plate 28 will remain in the position illustrated in FIGS. 1 and 4 under the influence of its biasing spring 30. When the pivotal plate 28 is in this position, its blocking pin 24, received within the slot of pivotal plate 28, is in its upper position such as to engage the extension 22 at the end of the backrest frame 4, as shown in FIG. 4, and thereby to limit the pivoting of the backrest (and also of the table assembly 10) to an intermediate position of the backrest.

Thus, opening the table tray 14 to its operative position will still permit the occupier of the forward seat to recline his backrest, but will limit the degree of reclining to an intermediate position such as not to cause food or drink on the tray to be spilled.

FIGS. 5–9 illustrate another embodiment of the invention wherein moving the table arms to their open operative position, rather than the table tray, will make the blocking means effective to block the backrest from being pivoted to its full reclining position.

Thus, this embodiment of the invention also comprises a seat, generally designated 102, having a backrest 104 including a frame 106 pivotally mounted about a horizontal axis 108; and a table assembly 110 having a pair of arms 112 pivotably mounted about horizontal axis 108 to either a folded, non-operative position, or to an open operative position, with respect to backrest 104. The upper end of table arms 112 carry a table tray 114 which is also pivotable to a folded, non-operative position substantially parallel to the arms 112, or to an open operative position at an obtuse angle to the arms.

In this case the blocking mechanism is provided on both sides of the seat and, as indicated above, is operated by opening the table arms 112 rather than the table tray 114 as in FIGS. 1–4. Thus, the blocking means at each side of the seat includes a mechanism comprising a link 120 pivotable at its lower end to frame 122 by means of another link 124 pivotable at one end to an intermediate portion of link 120, and at its upper end to the depending leg 126a of a bell-crank lever 126. The upper leg 126b of lever 126 is pivotable at 128 to the seat frame and is formed with an elongated slot 126c.

Each of the table arms 112 carries an L-shaped member 130 having a first leg 131 pivotable with the table arm 112 about horizontal axis 108, and a second leg 132 depending from leg 131 at its end opposite to the pivotal mounting 108. Depending leg 132 is provided with a pin 134 slidably received within slot 126c of bell-crank lever 126.

Legs 132 of the L-shaped members 130 attached to the table arms 112 constitute interposer elements which are moved to an active position, when the table arms 112 are pivoted to their open, operative positions, to engage the upper ends of the link 120, the latter constituting the blocking elements, to block the backrest 104 from being pivoted to its full reclining position. However, when the table arms 112 are in their folded, non-operative positions against the rear face of the backrest 104, interposer elements 132 are located in their inactive positions, wherein they do not engage the upper ends of links 120, and thereby they permit the backrest, as well as the table, to be pivoted to the full reclining position of the backrest.

The foregoing will be better understood by the following description of the operation of the FIGS. 5-9 embodiment.

Figure 7:
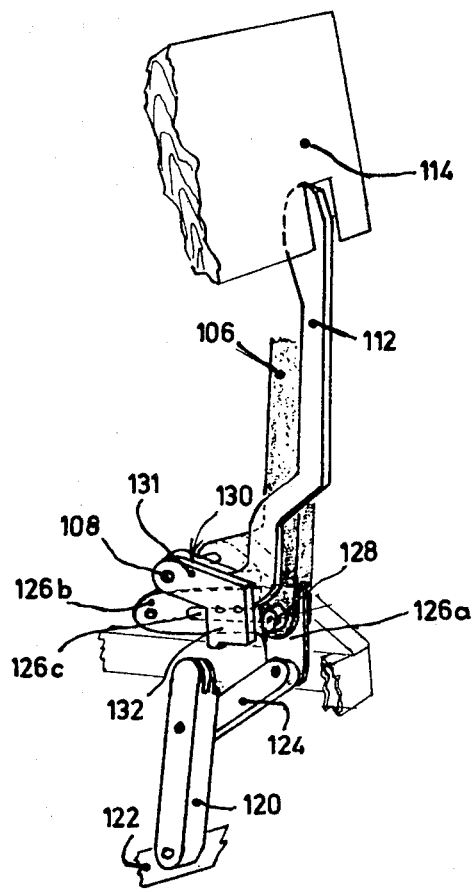
FIG. 7 is a three-dimensional view illustrating the blocking mechanism of FIG. 6 in unblocking position, FIG. 7a being a side elevational view of FIG. 7.
Figure 7A:
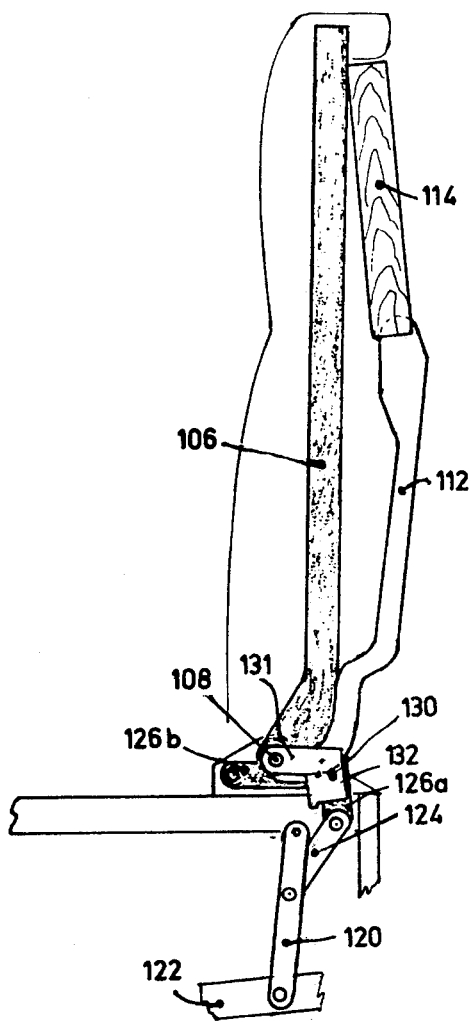

The three-dimensional view of FIG. 7, and the corresponding side elevational view of FIG. 7a, illustrate the foregoing parts of the above-described blocking mechanism in the positions they occupy when the backrest 104 is in its upright position and the table assembly 110 is in its folded, non-operative position, i.e., with the arms 112 of the table assembly folded against the rear face of the backrest and the table tray 114 folded substantially parallel to the arms 112. It will be seen that in this position, each of the L-shaped members 130 attached to the lower end of each of the table arms 112 is located such that its upper leg 130 is substantially horizontal, and its lower leg 132, constituting the interposer, is substantially vertical and is disposed slightly rearwardly of the upper end of link 120. Accordingly, when the backrest 104 is pivoted with the table assembly 110 about horizontal axis 108, the lower end of leg 132 will be clear of the upper end of link 120, and therefore both the backrest and the table assembly may be pivoted together about axis 108 to the full reclining position of the backrest, as illustrated in FIG. 8.

If, however, when the backrest 104 is in its upright position, the table arms 112 are in their open, operative positions as illustrated in FIG. 9, it will be seen that the L-shaped members 130 carried at the lower ends of the table arms will be inclined about horizontal axis 108, such that the depending legs 132 of members 130 will become aligned with the upper ends of the links 120. Now, should an attempt be made to pivot the backrest 104 to its full reclining position, this will be blocked by the lower ends of legs 132 engaging the upper ends of links 120.

Preferably, when legs 132 are pivoted to their active positions by moving the table arms 112 to their open, operative positions as described in the preceding paragraph, the lower edges of legs 132 are slightly spaced from the upper ends of the links 120 so as to permit some pivotal movement of the backrest 104 towards the reclining position, but to limit the degree of reclining to an intermediate position such as to avoid spilling any food or drink on the tray, as described above with respect to the embodiment of FIGS. 1-4. It will be appreciated, however, that the dimensioning and spacing of the foregoing parts could be such that moving interposer elements 130 to their active positions by opening the table arms 112 to their operative positions will block any pivotal movement of the backrest towards its reclining position.

While the invention has been described with respect to two preferred embodiments, it will be appreciated that many other variations, modifications and applications of the invention may be made.

What is claimed is:

1. A reclinable-seat and foldable-table assembly, comprising:
    a seat having a backrest pivotable about a horizontal axis from an upright position to a reclining position;
    a table pivotable with said backrest from said upright position to said reclining position;
    said table being further movable from a folded non-operative position against the rear side of the backrest to an open operative position for use by the occupier of the seat to the rear of said backrest; and
    blocking means effective, when the table is moved to its open operative position, to block the backrest from being pivoted to said reclining position.

2. An assembly according to claim 1, wherein said blocking means includes limiting means effective, when the table is moved to its open operative position, to limit the pivotable movement of the backrest to an intermediate position between said upright and reclining positions.

3. An assembly according to claim 1, wherein said table includes an arm member pivotably mounted at its lower end to a folded non-operative position or to an open operative position with respect to the backrest, and a tray member pivotably mounted at the upper end of the arm member to a folded non-operative position substantially parallel to the arm member, or to an open operative position at an obtuse angle to the arm member, said blocking means being effective, when one of said table members is in its open operative position, to block the backrest from being pivoted to said reclining position.

4. An assembly according to claim 3, wherein said blocking means includes means effective when the tray member is moved to its open operative position, to block the backrest from being pivoted to said reclining position.

5. An assembly according to claim 4, wherein said blocking means comprises:
    a blocking member;
    supporting means spring-urged to normally support the blocking member in blocking position with respect to the pivotable backrest but displaceable to move the blocking member to unblocking position with respect to the backrest;
    an interposer element carried by the table arm and positionable either to an active location to engage said supporting means and thereby to move said blocking member to its unblocking position when the table arm is pivoted with the backrest towards the reclining position, or to an inactive location not to engage said supporting means when the table arm is pivoted with said backrest and thereby to permit said blocking member to remain in its blocking position;
    and linkage coupling said tray member to said interposer element to move same to its active location when the tray member is in its folded non-operative position, and to move the interposer element to its inactive location when the tray member is in its open operative position.

6. An assembly according to claim 5, wherein said blocking member is a pin movable into blocking or unblocking position with respect to an element carried by said backrest.

7. An assembly according to claim 6, wherein said supporting means comprises a plate formed with a slot receiving said blocking pin, said plate being pivotably mounted so as to move said pin either to said blocking position or to said unblocking position, said plate being urged by a spring to said blocking position, said plate being engageable by the interposer element, when the latter is in its active location, to be moved to said unblocking position when the backrest and table arm are pivoted towards said reclining position.

8. An assembly according to claim 3, wherein said blocking means includes means effective when the arm member is moved to its open operative position, to block the backrest from being pivoted to said reclining position.

9. An assembly according to claim 8, wherein said backrest is pivotably mounted to the seat frame via a plural-linkage pivotable mounting, said arm member being pivotably mounted to said backrest, said blocking member being carried by said plural-linkage pivotable mounting of the backrest, said arm member including an interposer located such that: when the table arm member is pivoted to its open operative position with respect to the backrest, said interposer element engages said blocking member upon pivoting the backrest, to thereby block the pivoting of the backrest to said reclining position; but when the arm member is in its folded non-operative position with respect to said backrest, said interposer element does not engage said blocking member upon pivoting the backrest, to thereby permit the backrest to be pivoted to said reclining position.

10. An assembly according to claim 9, wherein said linkage of the pivotable mounting of the backrest includes a bell-crank lever having an upper leg pivotably mounted at one end to the seat frame, and a lower leg depending from the opposite end of the upper leg, said upper leg being formed with an elongated slot in which the backrest is pivotably mounted, said blocking member being a link pivotably mounted at its lower end to the frame and coupled at an intermediate portion thereof to the lower leg of said bell-crank lever, the upper end of said link being engageable by said interposer, when the arm member is in its open operative position and when the backrest is pivoted, to thereby block the pivoting of the backrest to its reclining position.

11. An assembly according to claim 9, wherein said interposer element is secured at the lower end of the arm member to depend below its pivot to the backrest, and to engage said blocking member when the arm member is in its open operative position, but not to engage the blocking member when the arm member is in its folded non-operative position.

* * * * *